US012682053B2

(12) United States Patent
Jaiswal et al.

(10) Patent No.: US 12,682,053 B2
(45) Date of Patent: Jul. 14, 2026

(54) SYSTEM FOR REDUCING FALSE ALERTS FROM NETWORK DETECTION AND RESPONSE TOOL

(71) Applicant: Vehere Interactive Pvt Ltd, Kolkata (IN)

(72) Inventors: Praveen Jaiswal, Kolkata (IN); Debapriyay Mukhopadhyay, Kolkata (IN); Japneet Singh Chahal, Patiala (IN)

(73) Assignee: Vehere Interactive Pvt Ltd, Kolkata (IN)

( * ) Notice: Subject to any disclaimer, the term of this patent is extended or adjusted under 35 U.S.C. 154(b) by 122 days.

(21) Appl. No.: 18/887,390

(22) Filed: Sep. 17, 2024

(65) Prior Publication Data

US 2025/0298894 A1 Sep. 25, 2025

(30) Foreign Application Priority Data

Mar. 22, 2024 (IN) .............................. 202431022246

(51) Int. Cl.
*G06F 21/55* (2013.01)

(52) U.S. Cl.
CPC .................................. *G06F 21/554* (2013.01)

(58) Field of Classification Search
CPC ..................................................... G06F 21/554
See application file for complete search history.

(56) References Cited

U.S. PATENT DOCUMENTS

| | | | | |
|---|---|---|---|---|
| 11,082,441 B1 * | 8/2021 | Bouguerra | ............. | G06N 3/045 |
| 12,111,928 B2 * | 10/2024 | Ma | ........................ | G06N 20/00 |
| 2009/0241196 A1 * | 9/2009 | Troyansky | .......... | H04L 63/1491 |
| | | | | 726/25 |
| 2020/0050760 A1 * | 2/2020 | El-Moussa | ........... | G06N 3/0499 |
| 2023/0123632 A1 * | 4/2023 | Karpovsky | ......... | G06F 16/9566 |
| | | | | 726/23 |
| 2024/0134976 A1 * | 4/2024 | Shachar | ................ | G06F 16/176 |
| 2025/0106233 A1 * | 3/2025 | Bishop, III | ......... | G06F 18/2321 |
| 2025/0133108 A1 * | 4/2025 | Dema | ................. | H04L 63/1466 |
| 2025/0300977 A1 * | 9/2025 | Jaiswal | ................. | H04L 63/166 |

FOREIGN PATENT DOCUMENTS

| | | | | | |
|---|---|---|---|---|---|
| CN | 110430226 B | * | 8/2021 | ........ | H04L 63/1416 |
| CN | 117955745 B | * | 7/2024 | .......... | G06F 18/253 |
| EP | 4145768 B1 | * | 11/2025 | ........ | H04L 65/1069 |

* cited by examiner

*Primary Examiner* — Sarah Su

(74) *Attorney, Agent, or Firm* — Kolisch Hartwell, P.C.

(57) ABSTRACT

A system and a method for reducing false alerts from network detection and response tools retrieves traffic data associated with a network session between a client device and a server. The traffic data includes a first set of parameters associated with the client device and a second set of parameters associated with the server. The system determines client and server entropy values based upon the retrieved traffic data. The system determines a non-empty packet value based upon the first set of parameters associated with the client device and the second set of parameters associated with the server. The system provides to a machine learning (ML) model, as an input, the client and server entropy values, and the non-empty packet value, and generates an alert based upon an output of the ML model.

20 Claims, 4 Drawing Sheets

400 —

400

Retrieve traffic data associated with network session between client device and server 402

Determine client entropy value 404

Determine server entropy value 406

Determine non-empty packet value 408

Provide, as input, client entropy value, server entropy value, and non-empty packet value to machine learning (ML) model 410

Generate alert based on output of ML model 412

SYSTEM FOR REDUCING FALSE ALERTS FROM NETWORK DETECTION AND RESPONSE TOOL

TECHNOLOGICAL FIELD

The present disclosure relates to the detection of malicious network sessions, and more specifically, to a system and a method for reducing false alerts from network detection and response tools.

BACKGROUND

Conventional network detection and response (NDR) systems are designed to monitor network traffic to detect the occurrence of malicious activities in a network session. The NDR systems detect the occurrence of malicious activities in the network session by analyzing the network traffic that bypasses security measures. Further, the NDR systems may employ various attack detection mechanisms to detect the occurrence of malicious activities and generate a warning for network administrators if malicious activities are detected in the network session. However, the existing attack detection mechanisms may pose various challenges for network administrators. For example, the NDR systems may generate a large number of warnings indicative of the occurrence of malicious activities in the network session. Such warnings may include several false warnings associated with the network session in addition to real warnings associated with the network session. Further, the network administrator may have to spend a large amount of time and resources to verify and process each warning with utmost caution, as if they were real warnings.

Therefore, there is a need for a method and a system offering a more streamlined and high-performance approach to effectively distinguish the real warnings and the false warnings associated with the network session.

BRIEF SUMMARY

A system and a method are provided herein that focuses on the classification of normal traffic sessions and malicious traffic sessions, thereby reducing false alerts from network detection and response (NDR) tools. The disclosed system leverages machine learning to effectively mitigate false alerts from the network detection and response tools thereby making it an invaluable asset for security incident response and investigation.

In one aspect, a system for reducing false alerts from network detection and response tools is provided. The system may include a processor configured to retrieve traffic data associated with a network session between a client device and a server. The traffic data includes at least one of a first set of parameters associated with the client device and a second set of parameters associated with the server. Further, the processor may be configured to determine a client entropy value based on the first set of parameters associated with the client device based on the retrieved traffic data. Further, the processor may be configured to determine a server entropy value based on the second set of parameters associated with the server based on the retrieved traffic data. Further, the processor may be configured to determine a non-empty packet value based on the first set of parameters associated with the client device and the second set of parameters associated with the server. Thereafter, the processor may be configured to provide, as an input, the client entropy value, the server entropy value, and the non-empty packet value to a machine learning (ML) model, and generate an alert based on an output of the ML model.

In additional system embodiments, the first set of parameters includes at least one of transmitted bytes data, client device payload data, client device address packet data, and client device non-empty packet count data.

In additional system embodiments, the client entropy value may be determined based on the transmitted bytes data. The client entropy value may correspond to the number of bytes transmitted from the client device to the server in the network session.

In additional system embodiments, the second set of parameters includes at least one of received bytes data, server payload data, server address packet data, and server non-empty packet count data.

In additional system embodiments, the server entropy value may be further determined based on the received bytes data. The server entropy value may correspond to the number of bytes received by the server from the client device in the network session.

In additional system embodiments, the non-empty packet value may be further determined based on client device non-empty packet count data and server non-empty packet count data.

In additional system embodiments, the processor may be further configured to determine, at a first timestamp, an occurrence of a malicious activity in a first network session. Further, the processor may be configured to detect, at the first timestamp, a trigger based on the determination of the occurrence of the malicious activity. Thereafter, the processor may be configured to provide, as the input, the client entropy value, the server entropy value, and the non-empty packet value to the ML model based on the detection of the trigger.

In additional system embodiments, the processor may be further configured to determine the occurrence of the malicious activity in the first network session using a set of malicious activity detection rules.

In additional system embodiments, the processor may be further configured to classify the network session as one of a normal network session or a malicious network session based on the output of the ML model. Further, the processor may be configured to generate the alert based on the classification of the network session and render the generated alert.

In additional system embodiments, the ML model may be pre-trained to classify the network session as one of a normal network session and a malicious network session based on the retrieved traffic data.

In additional system embodiments, the processor may be further configured to train the ML model based on the retrieved traffic data, and the generated alert.

In another aspect, a method for reducing false alerts from network detection and response tools is provided. The method may include retrieving traffic data associated with a network session between a client device and a server. The traffic data includes at least one of a first set of parameters associated with the client device and a second set of parameters associated with the server. Further, the method may include determining a client entropy value based on the first set of parameters associated with the client device based on the retrieved traffic data. Further, the method may include determining a server entropy value based on the second set of parameters associated with the server based on the retrieved traffic data Further the method may include determining a non-empty packet value based on the first set of parameters associated with the client device and the second set of parameters associated with the server. Thereafter, the method may include providing, as an input, the client entropy value, the server entropy value, and the non-empty packet value to a machine learning (ML) model, and generating an alert based on an output of the ML model.

In additional method embodiments, the first set of parameters includes at least one of transmitted bytes data, client device payload data, client device address packet data, and client device non-empty packet count data.

In additional method embodiments, the non-empty packet value may be further determined based on client device non-empty packet count data and server non-empty packet count data.

In additional method embodiments, the method may further include determining, at a first timestamp, an occurrence of a malicious activity in a first network session. Further, the method may include detecting, at the first timestamp, a trigger based on the determination of the occurrence of the malicious activity. Thereafter, the method may include providing, as the input, the client entropy value, the server entropy value, and the non-empty packet value to the ML model based on the detection of the trigger.

In additional method embodiments, the method may further include determining the occurrence of the malicious activity in the first network session using a set of malicious activity detection rules.

In additional method embodiments, the method may further include classifying the network session as one of a normal network session or a malicious network session based on the output of the ML model. Further, the method may include generating the alert based on the classification of the network session and rendering the generated alert.

In additional method embodiments, the ML model may be pre-trained to classify the network session as one of a normal network session and a malicious network session based on the retrieved traffic data.

In additional method embodiments, the method may further include training the ML model based on the retrieved traffic data, and the generated alert.

In yet another aspect, a non-transitory computer-readable storage medium carrying one or more sequences of one or more instructions which, when executed by at least one processor, cause a system to perform operations comprising retrieving traffic data associated with a network session between a client device and a server. The traffic data includes at least one of a first set of parameters associated with the client device and a second set of parameters associated with the server. The operations may further include determining a client entropy value based on the first set of parameters associated with the client device based on the retrieved traffic data. The operations may further include determining a server entropy value based on the second set of parameters associated with the server based on the retrieved traffic data. The operations may further include determining a non-empty packet value based on the first set of parameters associated with the client device and the second set of parameters associated with the server. The operations may further include providing, as an input, the client entropy value, the server entropy value, and the non-empty packet value, as an input, to a machine learning (ML) model. The operations may further include generating an alert based on an output of the ML model.

BRIEF DESCRIPTION OF THE DRAWINGS

Figure 1:
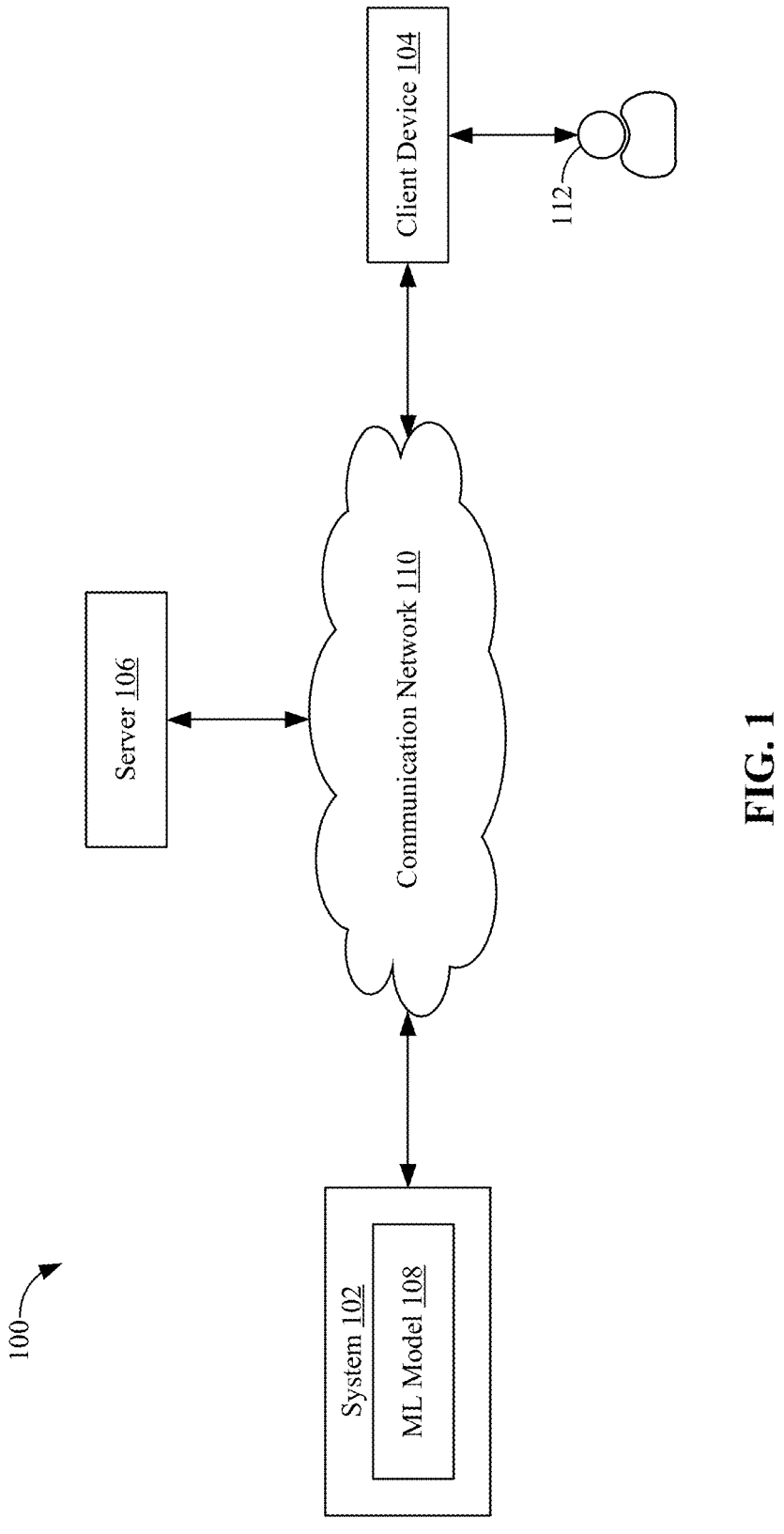
Figure 2:
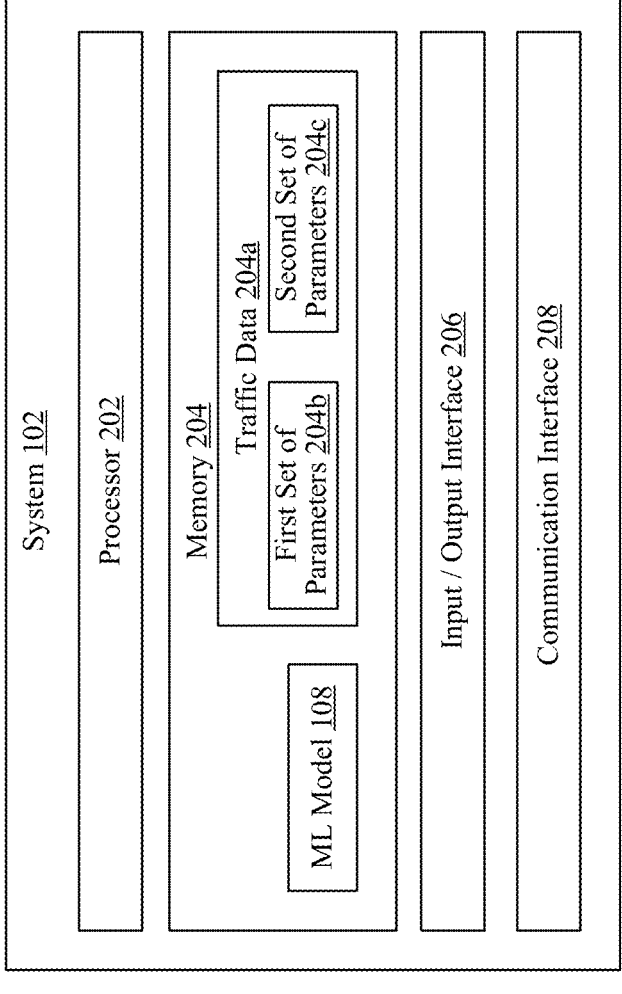
Figure 3:
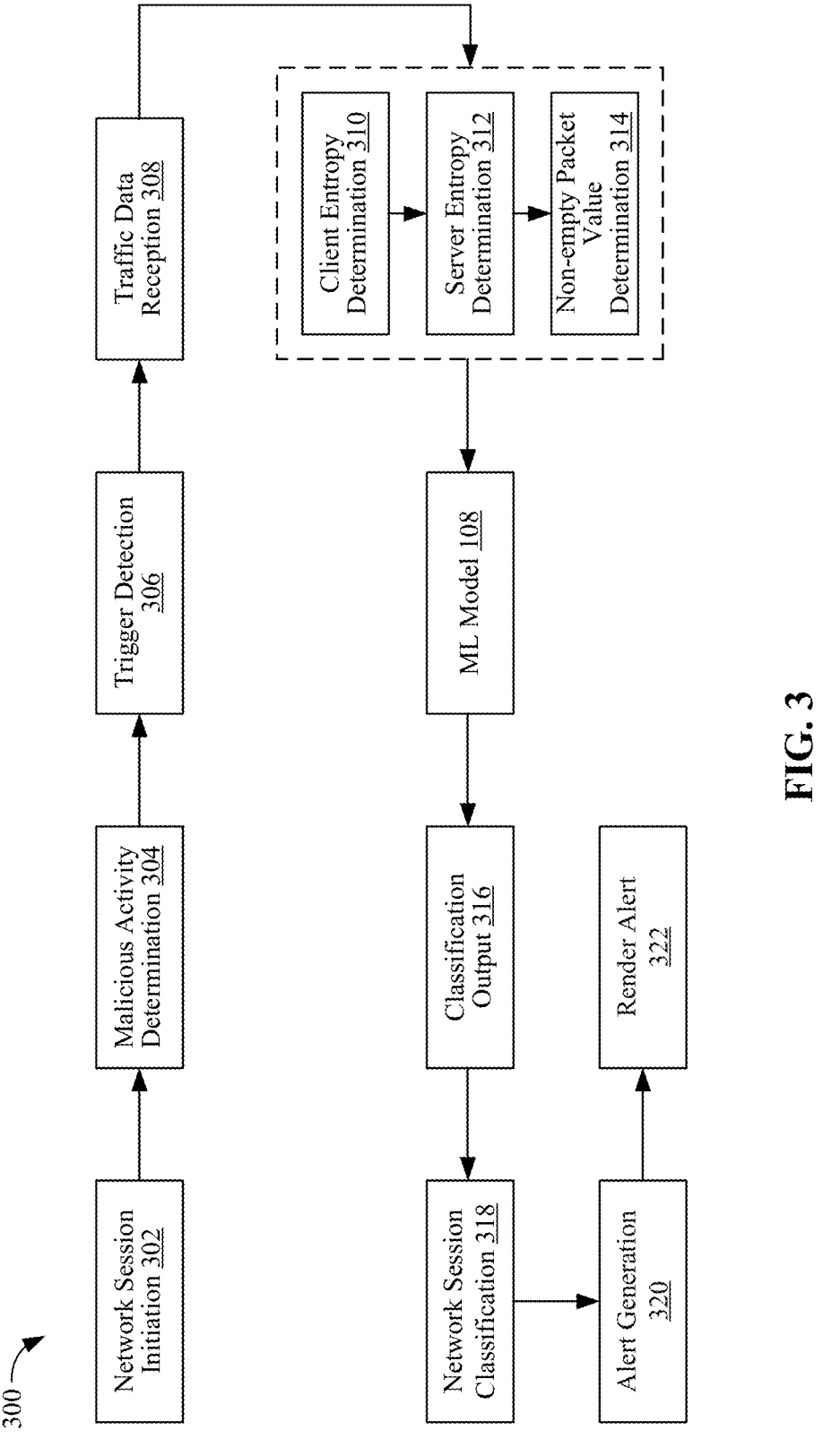
Figure 4:
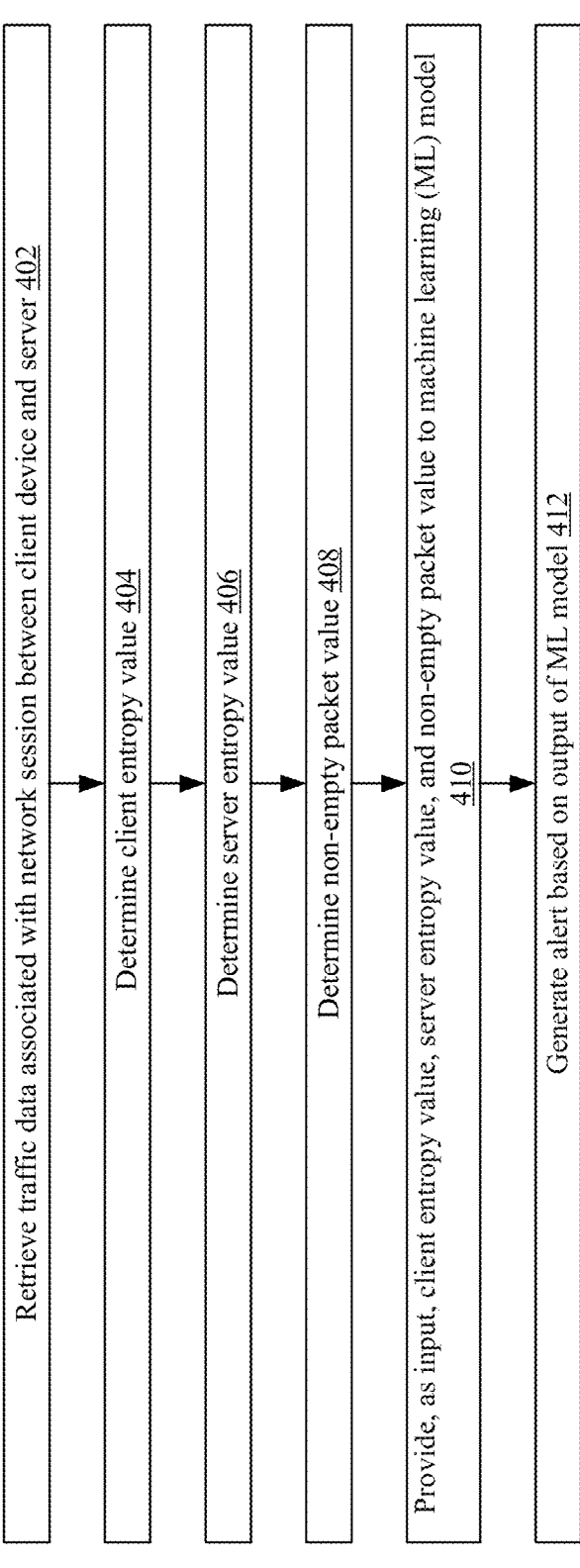

Having thus described example embodiments of the invention in general terms, reference will now be made to the accompanying drawings, which are not necessarily drawn to scale, and wherein:

FIG. 1 is a diagram that illustrates a network environment within which a system for reducing false alerts from network detection and response tools is implemented, in accordance with an embodiment of the disclosure;

FIG. 2 illustrates a block diagram of the system of FIG. 1, in accordance with an embodiment of the disclosure;

FIG. 3 is a diagram that illustrates exemplary operations for reducing the false alerts from the network detection and response tools, in accordance with an embodiment of the disclosure; and FIG. 4 is a flowchart that illustrates an exemplary method for reducing the false alerts from the network detection and response tools, in accordance with an embodiment of the disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, systems and methods are shown in block diagram form only to avoid obscuring the present disclosure.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect. Turning now to FIG. 1-FIG. 4, a brief description concerning the various components of the present disclosure will now be briefly discussed. Reference will be made to the figures showing various embodiments of a system for reducing false alerts from network detection and response tools.

FIG. 1 is a diagram that illustrates a network environment within which a system for reducing false alerts from network detection and response tools is implemented, in accordance with an embodiment of the disclosure. The network environment 100 may include the system 102, a client device 104, a server 106, and a communication network 110. With reference to FIG. 1, there is further shown a user 112 who may be associated with the client device 104.

The system 102 may be a highly specialized system that may integrate a hardware and a software for reducing false alerts from network detection and response tools. The system 102 may be equipped with a high-speed network interface, a multi-core processor, and a memory, the hardware configuration may support real-time processing and analysis. The custom software may orchestrate the communication network 110 monitoring process. The system 102 may further excel at network session identification, storage, and retrieval. The system 102 may be optimized for high-speed networks. For example, but not limited to, a 10 Giga bytes per second (GBPS) network. The system 102 may manage the network sessions and leverage machine learning techniques for efficient classification of the network session as at least one of a normal network session or a malicious network session. The system 102 may further provide data analysis, real-time monitoring, and security enhancement capabilities.

The system 102 may further include a machine learning (ML) model 108. The ML model 108 may be a classifier/ regression/clustering model that may be trained to identify a relationship between inputs, (such as features in a training dataset that may include a dataset of the plurality of parameters) and output labels that may include a dataset of classified events associated with the dataset of the plurality of parameters. The ML model 108 may be defined by its hyper-parameters, for example, the number of weights, cost function, input size, number of layers, and the like. The hyper-parameters of the ML model 108 may be tuned and weights may be updated to move towards a global minima of a cost function for the ML model 108. After several epochs of the training on the feature information in the training dataset, the neural network model may be trained to generate the ML model 108 and subsequently output a classification result for a set of inputs. The classification result may be indicative of a class label for each input of the set of inputs (e.g., traffic data associated with a network session)

The ML model 108 may include electronic data, such as, for example, a software program, code of the software program, libraries, applications, scripts, or other logic or instructions for execution by a processing device, such as the processor 202. The ML model 108 may include code and routines configured to enable a computing device, such as the processor 202 to perform one or more operations for the classification of one or more inputs into one or more events. The ML model 108 may be implemented using hardware including a processor, a microprocessor (e.g., to perform or control the performance of one or more operations), a field-programmable gate array (FPGA), or an application-specific integrated circuit (ASIC). Alternatively, in some embodiments, the neural network may be implemented using a combination of hardware and software. Although in FIG. 1, the ML model 108 is shown integrated within the system 102, the disclosure is not so limited. Accordingly, in some embodiments, the ML model 108 may be a separate entity in the system 102, without deviation from the scope of the disclosure. Examples of the ML model 108 may include, but are not limited to, a random forest model, a linear regression model, a logistic regression model, a decision tree model, and a K-mean-based model. In an embodiment, the ML model 108 may correspond to a trained neural network model, such as, but not limited to a deep neural network (DNN), a convolutional neural network (CNN), a recurrent neural network (RNN), a CNN-recurrent neural network (CNN-RNN), R-CNN, Fast R-CNN, Faster R-CNN, and an artificial neural network (ANN). Details about the ML model 108 are provided, for example, in FIG. 3.

The network environment 100 may further include the client device 104. The client device 104 may be a specialized machine that may be designed for a specific task within the network environment 100. The client device 104 may play a crucial role in receiving requests from the user 112, processing data, and delivering the data efficiently. The client device 104 may be designed for high-performance computing and data handling, ensuring that the user 112 requests may be handled accordingly and that the requested content is delivered to the user 112 seamlessly. For example, the client device 104 may include but is not limited to, a computer, a laptop, a smartphone, or a tablet.

Further, the client device 104 may correspond to any computing device that may be configured to initiate a request or action within a network. Specifically, the client device 104 may be configured to access various services such as the website, by sending a request to the server 106. The client device 104 may act as an end-user interface and originate communication to interact with the server 106. By initiating the communication process, the client device 104 may establish a connection with the server 106, facilitating the exchange of information and enabling the retrieval of desired web resources.

The server 106 may be a specialized machine that may be for a specific task within the network environment 100. The server 106 may play a crucial role in responding to the user 112 request, processing data, and delivering the data efficiently. The server 106 may be designed for high-performance computing and data handling, ensuring that the user 112 requests may be handled accordingly and that the requested content is delivered to the user 112 seamlessly. Load balancing and redundancy further enhance reliability, and the one or more servers in various locations worldwide optimize content delivery for the user 112 anywhere around the globe. For example, the server 106 may include but is not limited to, a mail server, a data server, an application server, or a database server.

In an embodiment, the user 112 may be a person from a corporation's dedicated information technology (IT) and a network management team, a telecommunications service provider management team, and the like. The user 112 may be associated with the system 102 to monitor network traffic, troubleshoot issues, and ensure optimal network performance across diverse regions. The user 112 may be equipped with the hardware and software of the system 102 to efficiently receive an alert for the network session from the system 102. The alert for the network session may be indicative of a malicious network session that may harm or impact the client device 104. The user 112 reliance on the system 102 may be critical in maintaining network integrity and uninterrupted business operations on a global scale.

In an embodiment, the system 102 may be communicatively coupled to the client device 104, the server 106, or any other device, via the communication network 110. The communication network 110 may correspond to a sophisticated and a versatile infrastructure designed to facilitate seamless data transmission, management, and retrieval. The communication network 110 may play a significant role in supporting a diverse range of communication types, including web browsing, email exchanges, real-time voice and video calls, and large-scale data transfers. The architectural design of the communication network 110 may incorporate various key elements and components, starting with a hierarchical network topology that may include core, distribution, and access layers to insure scalability, redundancy, and efficient data routing. Gateways and routers may be strategically positioned to connect local networks to the broader internet, efficiently managing the flow of data packets and ensuring proper routing. Network segmentation is a fundamental feature, with distinct Local Area Networks (LANs), Wide Area Networks (WANs), and data centers optimized to meet specific network requirements. The communication network 110 may adhere to established network protocols, including Transmission Control Protocol/Internet Protocol (TCP/IP), User Datagram Protocol (UDP), Hypertext Transfer Protocol (HTTP), Hypertext Transfer Protocol Secure (HTTPS), and Session Initiation Protocol (SIP), ensuring data consistency, reliability, and secure communication. Security may be a top priority, encompassing firewalls, intrusion detection and prevention systems, and encrypted protocols to safeguard data and network integrity. Load balancers may distribute incoming network traffic across multiple servers, enhancing network reliability and optimizing resource usage.

The communication network 110 may include network administrators (such as the user 112) who may employ one or more monitoring and analysis tools to track performance, identify malicious activity, and respond promptly to network issues. The communication network 110 scalability allows for the addition of devices, resources, and users without compromising performance or reliability. The user 112 associated with the system 102 may monitor, configure, and maintain the entire communication network 110, ensuring optimal operation. In summary, the communication network 110 may provide a robust infrastructure required for the network environment 100 to excel, supporting efficient data communication, management, and retrieval across various communication channels.

In operation, the user 112 may initiate the network session request between the client device 104 and the server 106. The network session may refer to a logical connection or interaction between the client device 104 and the server 106. The network session may be a fundamental concept in networking, particularly relating to protocols and applications that may require continuous or long-lasting interactions. The network session may involve the exchange of data between the client device 104 and the server 106 over the communication network 110. During the network session, data may be exchanged in the form of traffic data, and a series of requests and responses may be handled between the communicating entities. Therefore, the network session may be critical for maintaining context and state in networked applications, ensuring that data may be transmitted reliably and efficiently. The traffic data associated with the network session may include insights into the communication between the client device 104 and the server 106. Further, monitoring the traffic data during the network sessions is important for purposes such as, but not limited to, network optimization, security analysis, and performance evaluation.

The traffic data may refer to the comprehensive information generated by the communication activities within a network. The traffic data may encompass a variety of parameters important for understanding and managing network performance and security. The traffic data associated with the network session between the client device 104 and the server 106 may include a set of Internet Protocol (IP) packets and a timestamp associated with each IP packet of the set of IP packets. The set of IP packets may be a foundation of data transmission across the communication network 110 (that may include the internet). Each IP packet of the set of IP packets may include at least two components header data and payload data. The header data may include metadata that may include a source IP address, a destination IP address, a packet length, a time-to-live (TTL), and a checksum to verify data integrity. The payload data may include actual data, for example, but not limited to, web content, emails, and multimedia streams. The set of IP packets may play a significant role in the functioning of the Internet Protocol, enabling the efficient routing of data across communication network 110.

Further, the timestamp associated with each IP packet of the set of IP packets may correspond to a record of information at which the IP packet may be received. Such information may include, but is not limited to, a time interval and date associated with the reception of the IP packet. For example, a first IP packet may be received at a first timestamp that may be "17.04799501" and a second IP packet may be received 1 second later at a second timestamp that may be "17.04799502". In an example, the timestamp associated with each IP packet of the set of IP packets may be determined using the time of arrival in the Unix timestamp or Epoch timestamp.

Upon reception of the network session request by the user 112, the system 102 may retrieve the traffic data associated with the network session between the client device 104 and the server 106. The traffic data includes a first set of parameters associated with the client device 104 and a second set of parameters associated with the server 106. The first set of parameters associated with the client device 104 may include parameters specific to the client device 104 involved in the network session. For example, the first set of parameters may include the data associated with the client device 104, such as, but not limited to, the client device IP address, port number, transmitted bytes, received bytes, or any other relevant attributes characterizing the behavior of the client device 104 during the network session. In an embodiment, the first set of parameters may include but are not limited to, transmitted bytes data, client device payload data, client device address packet data, and client device non-empty packet count data. The transmitted bytes data may correspond to a volume of data transmitted from the client device 104 during the network session. The transmitted bytes of data may provide information associated with network traffic and bandwidth usage, thereby providing insights associated with the amount of data transmitted. The system 102 may further leverage transmitted bytes data to monitor network performance and efficiency.

The client device payload data may correspond to information transmitted by the client device 104 during the network session. The client payload data may include actual data or requests that may be transmitted by the client device 104 to the server 106 during the network session. For example, the client device payload data may include, but is not limited to, user input, files, messages, or any other relevant data transmitted by the client device 104 to the server 106.

The client device address packet data may correspond to packet data associated with an address of the client device 104. The address of the client device 104 may be for example, but not limited to an IP address, Media Access Control (MAC) address, or other unique identifiers associated with the address of the client device 104. The system 102 may transmit the client device address packet data during the network session to enable routing and delivery of the data to and from the client device 104.

The client device non-empty packet data may correspond to a number of packets transmitted from the client device 104 during the network session that may be non-empty. In other words, the client device non-empty packet data may correspond to a count of IP packets transmitted by the client device 104 that may include, for example, but not limited to text, files, images, commands, and any other relevant data transmitted by the client device 104 to the server 106.

The second set of parameters associated with the server 106 may include parameters related to the server 106 participating in the network session. The second set of parameters may include the data associated with the server 106, such as, but not limited to server IP address, port number, transmitted bytes, received bytes, or any other relevant data characterizing the behavior of the server 106 during the network session. In an embodiment, the second set of parameters may include, but are not limited to, received bytes data, server payload data, server address packet data, and server non-empty packet count data. The received bytes data correspond to a volume of data received by the server 106 from the client device 104 during the network session. The received bytes data may provide information associated with network traffic and bandwidth usage, thereby providing insights associated with the amount of data received (for example, the amount of data downloaded) during the network session. The system 102 may further leverage received bytes data to monitor network performance and efficiency.

The server payload data may correspond to information transmitted by the server 106 during the network session, in response to the requests from the client device 104. The server payload data may include actual data or requests that may be received by the server 106 from the client device 104, during the network session. For example, the server device payload data may include, but is not limited to, webpages, files, database records, or any other relevant data requested by the client device 104 from the server 106.

The server address packet data may correspond to packet data associated with an address of the server 106. The address of the server 106 may be for example, but not limited to an IP address, Media Access Control (MAC) address, or other unique identifiers associated with the address of the server 106. The system 102 may transmit the server address packet data during the network session to enable routing and delivery of the data to the client device 104 that may have raised the request.

The server non-empty packet count data may correspond to a number of packets received by the server 106 during the network session that may be non-empty. In other words, the server non-empty packet data may correspond to a count of IP packets received by the server 106 that may include, for example, but not limited to webpage requests, file downloads, and database queries.

In an embodiment, the system 102 may determine a client entropy value based on the first set of parameters associated with the client device 104 based on the retrieved data. The client entropy value may serve as a metric to gauge a degree of randomness or disorder in the transmitted bytes data. Specifically, the client entropy value may correspond to a measure of uncertainty in the data transmitted from the client device 104 to the server 106. In an embodiment, the client entropy value may be determined based on the transmitted bytes data. Further, the client entropy value may correspond to the number of bytes transmitted from the client device 104 to the server 106 in the network session.

In an example, the client entropy value may be determined using Shannon's entropy. The computation occurs in response to the reception of the traffic data related to the ongoing network session between the client device 104 and the server 106. The client entropy value serves as a quantifiable metric reflecting the level of disorder or randomness in the transmitted bytes data by the client device 104. Details associated with the determination of the client entropy value are provided, for example, in FIG. 3.

In an embodiment, the system 102 may further determine a server entropy value based on the second set of parameters associated with the server 106 based on the retrieved traffic data. The server entropy value may serve as an important parameter in the analysis of the traffic data. Further, the server entropy value may provide the information about a degree of randomness or disorder in the received bytes data. Moreover, the server entropy value may serve as a valuable indicator for detecting anomalies in data transmission patterns initiated by the server 106. The server entropy value may be determined based on the received bytes data. Further, the server entropy value may correspond to a number of bytes received by the server 106 from the client device 104 in the network session. Additionally, the server entropy value may provide insight into potential irregularities in data patterns that may be indicative of malicious activity. Details associated with the determination of the server entropy value are provided, for example, in FIG. 3.

Further, the system 102 may be configured to determine a non-empty packet value based on the first set of parameters associated with the client device 104 and the second set of parameters associated with the server 106. The non-empty packet value may be determined based on a determination that the payload data associated with each IP packet transmitted from the client device 104 to the server 106 or received by the server 106 may correspond to a non-empty packet. The non-empty packet may correspond to an IP packet that may include, for example, but not limited to webpages or webpage requests, files or file downloads, and database records or database queries. The non-empty packet value may be determined based on the client device non-empty packet count data and the server non-empty packet count data. Details associated with the determination of the non-empty packet value are provided, for example, in FIG. 3.

Thereafter, the system 102 may be configured to provide, as an input, the client entropy value, the server entropy value, and the non-empty packet value to a machine learning (ML) model 108, and generate an alert based on an output of the ML model 108. Details associated with the ML model 108 are provided, for example, in FIG. 3.

Conventional network detection and response (NDR) systems may pose various challenges associated with distinguishing real warnings and false warnings associated with the network session using the exiting attach detection mechanisms. The false warnings from the NDR systems may consume valuable time and resources, thereby hindering effective threat response.

To overcome the existing problems, the proposed system 102 may leverage the ML model 108 to effectively distinguish the real warnings, and the false warnings associated with the network session. The ML model 108 may classify the network traffic as a normal network traffic or a malicious network traffic based on the retrieved traffic data, thereafter, the system 102 may generate the alert based on the classification. The system 102 may correspond to a reliable and light weight enhancement to the NDR systems, thereby optimizing the process by accurately distinguishing the real warnings and the false warnings associated with the network session.

FIG. 2 illustrates a block diagram 200 of the system of FIG. 1, in accordance with an embodiment of the disclosure. FIG. 2 is explained in conjunction with FIG. 1. In FIG. 2, there is shown the block diagram 200 of the system 102. The system 102 may include at least one processor 202 (referred to as a processor 202, hereinafter), at least one non-transitory memory 204 (referred to as a memory 204, hereinafter), an input/output (I/O) interface 206, and a communication interface 208. The processor 202 may be connected to the memory 204, the I/O interface 206, and the communication interface 208 through one or more wired or wireless connections. Although in FIG. 2, it is shown that the system 102 includes the processor 202, the memory 204, the I/O interface 206, and the communication interface 208 however, the disclosure may not be so limiting and the system 102 may include fewer or more components to perform the same or other functions of the system 102.

The processor 202 of the system 102 may be configured to classify a normal network session or a malicious network session using the ML model 108, thereby reducing false alerts from the network detection and response tools. The processor 202 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application-specific integrated circuit), an FPGA (field programmable gate array), a microcontroller unit (MCU), a hardware accelerator, a special-purpose computer chip, or the like. As such, in some embodiments, the processor 202 may include one or more processing cores configured to perform independently. A multi-core processor may enable multiprocessing within a single physical package. Additionally, or alternatively, the processor 202 may include one or more processors configured in tandem via the bus to enable independent execution of instructions, pipelining, and/or multithreading. Additionally, or alternatively, the processor 202 may include one or more processors capable of processing large volumes of workloads and operations to provide support for big data analysis. In an example embodiment, the processor 202 may be in communication with the memory 204 via a bus for passing information among components of the system 102.

For example, when the processor 202 may be embodied as an executor of software instructions, the instructions may specifically configure the processor 202 to perform the algorithms and/or operations described herein when the instructions are executed. However, in some cases, the processor 202 may be a processor-specific device (for example, a mobile terminal or a fixed computing device) configured to employ an embodiment of the present disclosure by further configuration of the processor 202 by instructions for performing the algorithms and/or operations described herein. The processor 202 may include, among other things, a clock, an arithmetic logic unit (ALU), and logic gates configured to support the operation of the processor 202. The communication network 110 may be accessed using the communication interface 208 of the system 102. The communication interface 208 may provide an interface for accessing various features and data stored in the system 102.

The memory 204 may be non-transitory and may include, for example, one or more volatile and/or non-volatile memories. In other words, for example, the memory 204 may be an electronic storage device (for example, a computer readable storage medium) comprising gates configured to store data (for example, bits) that may be retrievable by a machine (for example, a computing device like the processor 202). The memory 204 may be configured to store information, data, content, applications, instructions, or the like, for enabling the system 102 to carry out various functions in accordance with an example embodiment of the present disclosure. For example, the memory 204 may be configured to buffer input data for processing by the processor 202. As exemplified in FIG. 2, the memory 204 may be configured to store instructions for execution by the processor 202. As such, whether configured by hardware or software methods, or by a combination thereof, the processor 202 may represent an entity (for example, physically embodied in circuitry) capable of performing operations according to an embodiment of the present disclosure while configured accordingly. Thus, for example, when the processor 202 is embodied as an Application Specific Integrated Circuit (ASIC), Field Programmable Gate Array (FPGA), or the like, the processor 202 may be specifically configured hardware for conducting the operations described herein. In an embodiment, memory may be configured to store the ML model 108, and traffic data 204a associated with the network session between the client device 104 and the server 106. Further, the traffic data 204a may include a first set of parameters 204b associated with the client device 104, and a second of parameters 204c associated with the server 106.

In one embodiment, the processor 202 may be configured to train the ML model 108 based on the traffic data 204a and the generated alert and store the ML model 108 in the memory 204. In an embodiment, the ML model 108 may correspond to a random forest model. In an embodiment, the ML model 108 may be used for various tasks such as but not limited to, classification, regression, pattern recognition, and decision-making.

In some example embodiments, the I/O interface 206 may communicate with the system 102 and display the input and/or output of the system 102. As such, the I/O interface 206 may include a display and, in some embodiments, may also include a keyboard, a mouse, a touch screen, touch areas, soft keys, or other input/output mechanisms. In one embodiment, the system 102 may include a user interface circuitry configured to control at least some functions of one or more I/O interface elements such as a display and, in some embodiments, a plurality of speakers, a ringer, one or more microphones and/or the like. In an embodiment, the I/O interface 206 may be configured to render the generated alert. The processor 202 and/or I/O interface 206 circuitry including the processor 202 may be configured to control one or more functions of one or more I/O interface 206 elements through computer program instructions (for example, software and/or firmware) stored on a memory 204 accessible to the processor 202.

The communication interface 208 may include the input interface and output interface for supporting communications to and from the system 102 or any other component with which the system 102 may communicate. The communication interface 208 may be any means such as a device or circuitry embodied in either hardware or a combination of hardware and software that is configured to receive and/or transmit data to/from a communications device in communication with the system 102. In this regard, the communication interface 208 may include, for example, an antenna (or multiple antennae) and supporting hardware and/or software for enabling communications with a wireless communication network. Additionally, or alternatively, the communication interface 208 may include the circuitry for interacting with the antenna(s) to cause transmission of signals via the antenna(s) or to handle receipt of signals received via the antenna(s). In some environments, the communication interface 208 may alternatively or additionally support wired communication. As such, for example, the communication interface 208 may include a communication modem and/or other hardware and/or software for supporting communication via cable, digital subscriber line (DSL), universal serial bus (USB), or other mechanisms.

FIG. 3 is a diagram that illustrates exemplary operations for reducing false alerts from network detection and response tools, in accordance with an embodiment of the disclosure. FIG. 3 is explained in conjunction with elements of FIG. 1, and FIG. 2. With reference to FIG. 3, there is shown a block diagram 300 that illustrates exemplary operations from 302 to 322, as described herein. The exemplary operations illustrated in the block diagram 300 may start at 302 and may be performed by the system 102 of FIG. 1 or the processor 202 of FIG. 2.

At 302, a network session may be initiated. In an embodiment, the user 112 may initiate a request to establish a network session between the client device 104 and the server 106. For example, the user 112 may initiate a request to establish the network session with a website for example, "www.abcxyz.com". In an embodiment, the processor 202 may be configured to retrieve traffic data (for example, the traffic data 204a) associated with the network session between the client device 104 and the server 106. The traffic data 204a associated with the network session between the client device 104 and the server 106 may include a set of Internet Protocol (IP) packets and a timestamp associated with each IP packet of the set of IP packets, as described, for example, in FIG. 1.

In an embodiment, the processor 202 may be configured to analyze and monitor the retrieved traffic data 204a to detect potential security threats. Such potential security threats may correspond to unusual patterns, deviations from established baseline, or unexpected spikes in data volume in traffic data. Further, such potential security threats may correspond to malicious activities in the network session. Examples of malicious activities may include such as but are not limited to denial-of-service attacks, data exfiltration, or identifying bottlenecks.

At 304, a malicious activity may be determined. In an embodiment, the processor 202 may be configured to determine, at a first timestamp, an occurrence of malicious activity in the network session. The first timestamp may correspond to a time interval associated with the reception of the traffic data. In an example, the first timestamp may be associated with a first IP packet transmitted during the network session between the client device 104 and the server 106. The processor 202 may analyze the traffic data 204a to determine the occurrence of malicious activity in the network session.

In an embodiment, the processor 202 may be configured to determine the occurrence of malicious activity in the network session using a set of malicious activity detection rules. The set of malicious activity detection rules may correspond to a sophisticated framework, enabling the processor 202 to analyze the traffic data 204a based on predefined criteria indicative of potential security threats. The set of malicious activity detection rules may enhance the capabilities of the system 102 to precisely identify and categorize malicious activities. The set of malicious activity detection rules may include, but are not limited to, signature-based attack detection mechanisms, and anomaly-based attack detection mechanisms. It is to be noted that the set of malicious activity detection rules may include any other attack detection mechanisms without departing from the scope of the present disclosure.

In an exemplary embodiment, the signature-based attack detection mechanisms may perform signature matching to optimize the decision-making process to determine the occurrence of malicious activity in the network session. The signature matching may employ a comparison of patterns within the traffic data 204a with pre-defined signatures associated with known threats or known patterns. For example, the processor 202 may be configured to identify patterns or signatures in the retrieved traffic data 204a. Further, the signature-based attack detection mechanisms may be configured to compare the identified patterns with its repository of predefined signatures, aiming to detect any exact match associated with a specific type of previously identified malicious activities. The signature-based attack detection mechanisms may provide a rapid and effective means of identifying threats for which patterns are already documented. In another exemplary embodiment, the processor 202 may be configured to employ anomaly-based attack detection mechanisms to detect attacks for which the signature or pattern may not be known. The anomaly-based attack detection mechanisms may be capable of identifying unknown or novel attack patterns, providing a more robust defense against emerging threats.

At 306, a trigger may be detected. In an embodiment, the processor 202 may be configured to detect, at the first timestamp, the trigger based on the determination of the occurrence of the malicious activity. The trigger may correspond to a warning or an alert for a network administrator (such as the user 112) indicative of the occurrence of a malicious activity in the network session. However, such a trigger may correspond to a false alert associated with the network session or a real alert associated with the network session. To effectively distinguish between the real alert and the false alert associated with the network session, the system 102 is provided.

At 308, traffic data may be retrieved. In an embodiment, the processor 202 may be configured to retrieve the traffic data 204a associated with the network session between the client device 104 and the server 106. In an example, the processor 202 may be configured to retrieve the traffic data 204a associated with the network session for which the trigger has been detected. Further, the processor 202 may be configured to monitor and analyze the traffic data 204a to extract the key parameters that may play a crucial role in classifying the network sessions. The traffic data 204a may include but is not limited to a first set of parameters associated with the client device 104 and a second set of parameters associated with the server 106. In an example, the first set of parameters 204b may include, but is not limited to, transmitted bytes data, client device payload data, client device address packet data, and client device non-empty packet count data. In an example, the second set of parameters 204c may include, but is not limited to, received bytes data, server payload data, server address packet data, and server non-empty packet count data. Details associated with the first set of parameters 204b and the second set of parameters 204c are provided, for example, in FIG. 1.

The processor 202 may be configured to actively capture and retrieve the traffic data associated with the network session between the client device 104 and the server 106. Such retrieval process may typically involve employing network monitoring tools, packet analyzers, or similar technologies to intercept and examine the transmitted and received bytes data, extracting pertinent details about the client device 104 and the server 106.

At 310, a client entropy value may be determined. In an embodiment, the processor 202 may be configured to determine the client entropy value based on the first set of parameters 204*b* associated with the client device 104 based on the retrieved traffic data 204*a*. Further, the client entropy value may be determined based on the transmitted bytes data. In an embodiment, the client entropy value may correspond to the number of bytes transmitted from the client device 104 to the server 106 in the network session.

In an embodiment, the processor 202 may be configured to determine the client entropy value based on analysis of the transmitted bytes data, representing the volume of data transmitted from the client device 104 and the server 106 during the network session. The client entropy value may serve as a quantitative measure that correlates with the number of bytes transmitted by the client device 104. As client device 104 engages in communication with the server 106, the client entropy value becomes a primary parameter in understanding the nature of the transmitted information. A substantially high value or a substantially low value associated with the client entropy value may be indicative of specific patterns or irregularities within the transmitted bytes data, providing insights into potential anomalies or abnormal data generation. By quantifying the entropy of transmitted bytes, the system 102 may enhance its ability to differentiate between a normal network session and a malicious network session, facilitating a more nuanced and accurate assessment of security threats in real-time network scenarios.

Further, the processor 202 may be configured to determine the client entropy value based on a computation of Shannon's entropy on the first set of parameters 204*b* associated with the client device 104. In an example, the client entropy value may be determined by considering a maximum of the first 2048 bytes transmitted from the client device 104 to the server 106 in the network session. In another example, the client entropy value may be determined by considering any number of bytes transmitted from the client device 104 to the server 106 in the network session. Thereafter, the processor 202 may be configured to scale the client entropy value between, for example, but not limited to 0 to 256, allowing for a standardized representation. For example, a substantially low client entropy value, such as below 25, may indicate the occurrence of suspicious activities, such as but not limited to botnet-based communication or Distributed Denial of Service (DDoS) attack-based scenarios that transmit IP packets synthetic data. On the contrary, a substantially high client entropy value, such as more than 230, may indicate potential threats.

At 312, a server entropy value may be determined. In an embodiment, the processor 202 may be configured to determine the server entropy value based on the second set of parameters 204*c* associated with the server 106 based on the retrieved traffic data 204*a*. Further, the server entropy value may be determined based on the received bytes data. In an embodiment, the server entropy value may correspond to a number of bytes received by the server 106 from the client device 104 in the network session.

In an embodiment, the processor 202 may be configured to determine the server entropy value based on analysis of the received bytes data, representing the volume of data received by the server 106 from the client device 104 within the ongoing network session. The server entropy values directly correlate with the number of bytes received by the server 106 from the client device 104 during the communication. A substantially high value or a substantially low value associated with the server entropy value may indicate specific patterns or irregularities within the received bytes data, offering insights into potential anomalies or abnormal data patterns.

Further, the processor 202 may be configured to determine the server entropy value based on a computation of Shannon's entropy on the second set of parameters 204*c* associated with the server 106. In an example, the server entropy value may be determined by considering a maximum of the first 2048 bytes received by the server 106 from the client device 104 in the network session. In another example, the server entropy value may be determined by considering any number of bytes received by the server 106 from the client device 104 in the network session. Thereafter, the processor 202 may be configured to scale the server entropy value between, for example, but not limited to 0 to 256, allowing for a standardized representation. For example, a substantially low server entropy value, such as below 25, may be indicative of suspicious activity, often observed in botnet-based communication or Distributed Denial of Service (DDoS) attack-based scenarios. On the contrary, a substantially high server entropy value, such as, more than 230, may signal potential threats. For example, in certain attack scenarios, an attacker may attempt to manipulate the server-generated data to exploit vulnerability or disguise their action. By analyzing server entropy patterns in benign traffic sessions and those that deviate, providing an understanding of the network's security landscape and aiding in the identification of potential security threats.

At 314, a non-empty packet value may be determined. In an embodiment, the processor 202 may be configured to determine the non-empty packet value based on the first set of parameters 204*b* associated with the client device 104 and the second set of parameters 204*c* associated with the server 106. Further, the non-empty packet value may be determined based on the client device non-empty packet count data and the server non-empty packet count data. Such non-empty packet count data signifies a count of packets including substantial content, thereby emphasizing meaningful data transmission between the client device 104 and the server 106 during the ongoing network session. Further, a comprehensive overview of the active communication and data exchange occurring within the network session may be provided. In an example, a high non-empty packet value may indicate active communication between the client device 104 and the server 106, thereby indicating transmission of a significant number of bytes from the client device 104 to the server 106. Conversely, a low non-empty packet value may suggest less active or sporadic communication between the client device 104 and the server 106.

In an embodiment, the processor 202 may be configured to provide, as an input, the client entropy value, the server entropy value, and the non-empty packet value to the machine learning (ML) model 108. The processor 202 may provide, as the input, the calculated parameters (such as the client entropy value, the server entropy value, and the non-empty packet value) to the ML model 108 for further analysis and decision-making. In an embodiment, the ML model 108 may be pre-trained to classify the network session as one of a normal network session and a malicious network session based on the retrieved traffic data 204*a*. The ML model 108 may analyze the traffic data 204*a* and classify the network session, thereby effectively distinguishing between the normal network session and the malicious network session.

In an embodiment, the ML model 108 may correspond to a random forest classifier for binary classification, enhancing its ability to differentiate between the normal network session and the malicious network session. The random forest classifier leverages a collection of decision trees, contributing to robust and accurate classification results.

The ML model 108 may be pre-trained with a comprehensive training dataset comprising a diverse array of traffic data examples. Such training datasets may include instances of normal traffic data as well as scenarios representing various forms of malicious traffic data. The training dataset may incorporate the traffic data 204a including the client entropy value, the server entropy value, non-empty packet value, total payload size (such as client device payload data and server payload data), transmitted bytes data (for example, the bytes transmitted from the client device 104 to the server 106), and the received bytes data (for example, the bytes received by the server 106 from the client device 104). The training dataset may enable the ML model 108 to recognize patterns and relationships inherent in the traffic data.

Further, the system 102 may leverage the ML model 108 to make real-time predictions or classification for the ongoing network session, thereby dynamically classifying whether the network session corresponds to the normal network session or the malicious network session. Such classification enhances the efficiency of the system 102 thereby minimizing false triggers associated with the network sessions. This may further allow the user 112 (such as the network administrator) to focus on real security threats, thereby minimizing time and resource consumption.

At 316, a classification output of ML model 108 may be generated. In an embodiment, the processor 202 may be configured to classify the network session as the normal network session or the malicious network session based on the output of the ML model 108. The ML model 108 may be configured to classify the network session as the normal network session or the malicious network session based on the retrieved traffic data 204a. In an embodiment, ML model 108 may further employ a correlation module in addition to the random forest classifier to optimally classify the network session as the normal network session or the malicious network session. The correlation module may refine the accuracy of the decision-making process by adding an additional layer of scrutiny to ensure the accuracy of the classification. This may further enhance the overall reliability of the system 102. In an example, the correlation module may compare the trigger detected in the network session based on the set of malicious activity detection rules and a trigger detected in the corresponding network session based on the random forest classifier and classify the network session as the normal network session or the malicious network session. This may enable the system 102 to effectively distinguish between the real triggers and the false triggers associated with the network session and mitigate false alerts from the network detection and response systems.

At 318, the network session may be classified. In an embodiment, the processor 202 may be configured to classify the network session as the normal network session based on the output of the ML model 108. In another embodiment, the processor 202 may be configured to classify the network session as the malicious network session based on the output of the ML model 108. For example, the processor 202 may detect a trigger based on the determination of the occurrence of the malicious activity in the network session such as "A" using the set of malicious activity detection rules. Further, if the processor 202 detects the trigger in the corresponding network session "A" based on the random forest classifier module, the ML model 108 may classify the network session as a malicious network session. On the contrary, if the processor may not detect the trigger in the corresponding network session "A" based on the random forest classifier module, the ML model 108 may classify the network session as the normal network session, thereby indicating a false alert in the network session.

At 320, an alert may be generated. In an embodiment, the processor 202 may be configured to generate the alert based on the output of the ML model 108. Specifically, the processor 202 may be configured to generate the alert based on the classification of the network session. The alert may be generated as a result of analysis of the inputs, including the client entropy, the server entropy, and the non-empty packet count value provided to the ML model 108. The generated alerts may correspond to a notification or indication of potential security threats or abnormal network behavior.

Such classification-driven alert generation may ensure that the generated alert may correspond to a real alert, providing the network administrator with actionable insights for a swift and targeted intervention. For example, the alert may correspond to a warning message for the user 112 (such as the network administrator) based on the classification of the network session as a malicious network session. In another example, the generated alert may correspond to a notification message for the user 112 such as network administrator based on the classification of the network session as the normal network session.

At 322, the generated alert may be rendered. In an embodiment, the processor 202 may be configured to render the generated alert. The rendering of the generated alert may involve presenting the generated alerts in a comprehensive format, making them accessible to the user 112 such as network administrators. The rendering mechanism may ensure the prompt visibility of the generated alert and may also provide a means for network administrators to comprehend and respond to the detected security events effectively. For example, the alert may be displayed on the client device 104 associated with the user 112 for example, but not limited to as a notification message, a warning message, or an alarm.

In another embodiment, the processor 202 may be configured to train the ML model 108 based on the retrieved traffic data 204a, and the generated alert. The training process may involve incorporating insights gained from the actual network activities and associated alerts. The ML model 108 undergoes iterative improvements, enhancing its ability to discern and respond effectively to potential security threats. The ML model 108 systematically processes the training dataset, discerning the unique characteristics associated with normal network sessions and malicious network sessions. By iteratively adjusting its internal parameter, the ML model 108 hones its ability to generalize and make informed decisions when exposed to unseen data.

Further, the incorporation of ML model 108 enhances the system's ability to adapt to evolving attack techniques and reduces false positives in the NDR systems. By leveraging the insights gained from the client entropy value and the server entropy value, along with the non-empty pocket value, the ML model 108 may contribute to a more sophisticated and accurate classification of network traffic sessions. The system 102 may optimize its performance and focus on responding to real alerts, contributing to the overall effectiveness of the system 102 in minimizing false positive alerts.

The system 102 may reduce the false alerts, thereby enhancing user 112 experience in the NDR systems. The system 102 may further adapt to the changing nature of anomaly attacks and detect false alerts, which may be classified as real alerts in the future. The closed-loop analysis, alert generation, and user 112 intervention enhance the system 102 effectiveness in real-time threat detection and response within the network environment.

Accordingly, blocks of the block diagram 300 support combinations of means for performing the specified functions and combinations of operations for performing the specified functions. It will also be understood that one or more blocks of the block diagram 300, and combinations of blocks in the block diagram 300, can be implemented by special-purpose hardware-based computer systems which perform the specified functions, or combinations of special-purpose hardware and computer instructions.

FIG. 4 is a flowchart that illustrates an exemplary method for reducing false alerts from the network detection and response tools, in accordance with an embodiment of the disclosure. FIG. 4 is explained in conjunction with elements from FIG. 1, FIG. 2, and FIG. 3. With reference to FIG. 4, there is shown a flowchart 400. The operations of the exemplary method may be executed by any computing system, for example, by the system 102 of FIG. 1 or the processor 202 of FIG. 2. The operations of the flowchart 400 may start at 402.

At 402, traffic data associated with a network session may be retrieved. In an embodiment, the processor 202 may be configured to retrieve the traffic data 204a associated with the network session between the client device 104 and the server 106. The traffic data 204a includes at least the first set of parameters 204b associated with the client device 104, and the second set of parameters 204c associated with the server 106. Details associated with the retrieval of the traffic data 204a are provided, for example, in FIG. 3.

At 404, a client entropy value may be determined. In an embodiment, the processor 202 may be configured to determine the client entropy value based on the first set of parameters 204b associated with the client device 104 based on the retrieved traffic data 204a. The client entropy may be determined based on the transmitted bytes data. Details associated with the determination of the client entropy value are provided, for example, in FIG. 3.

At 406, a server entropy may be determined. In an embodiment, the processor 202 may be configured to determine the server entropy value based on the second set of parameters 204c associated with the server 106 based on the retrieved traffic data 204a. The server entropy value may be determined based on the received bytes data. Details associated with the determination of the server entropy value are provided, for example, in FIG. 3.

At 408, a non-empty packet value may be determined. In an embodiment, the processor 202 may be configured to determine the non-empty packet value based on the first set of parameters 204b associated with the client device 104 and the second set of parameters 204c associated with the server 106. The non-empty packet value may be determined based on the client device non-empty packet count data and the server non-empty packet count data. Details associated with the determination of the non-empty packet value are provided, for example, in FIG. 3.

At 410, an input may be provided to the ML model 108. In an embodiment, the processor 202 may be configured to provide, as the input, the client entropy value, the server entropy value, and the non-empty packet value to the ML model 108. Details associated with the ML model 108 are provided, for example, in FIG. 1 and FIG. 3.

At 412, an alert may be generated. In an embodiment, the processor 202 may be configured to generate the alert based on the output of the ML model 108. Details associated with the generation of the alert generation are provided, for example, in FIG. 3.

Accordingly, blocks of the flowchart 400 support combinations of means for performing the specified functions and combinations of operations for performing the specified functions. It will also be understood that one or more blocks of the flowchart 400, and combinations of blocks in the flowchart 400, can be implemented by special-purpose hardware-based computer systems that perform the specified functions, or combinations of special-purpose hardware and computer instructions.

Alternatively, the system 102 may comprise means for performing each of the operations described above. In this regard, according to an example embodiment, examples of means for performing operations may comprise, for example, the processor and/or a device or circuit for executing instructions or executing an algorithm for processing information as described above.

Various embodiments of the disclosure may provide a non-transitory computer-readable medium and/or storage medium having stored thereon, instructions executable by a machine and/or a computer to operate a system (e.g., the system 102) for reducing false alerts from network detection and response tools. The instructions may cause the machine and/or computer to perform operations including retrieving traffic data 204a associated with a network session between a client device 104 and a server 106. The traffic data 204a includes at least one of a first set of parameters 204b associated with the client device 104 and a second set of parameters 204c associated with the server 106. The operation may further include determining a client entropy value based on the first set of parameters 204b associated with the client device 104 based on the retrieved traffic data 204a. The operation may further include determining a server entropy value based on the second set of parameters 204c associated with the server 106 based on the retrieved traffic data 204a. The operation may further include determining a non-empty packet value based on the first set of parameters 204b associated with the client device 104 and the second set of parameters 204c associated with the server 106. The operation may further include providing, as an input, the client entropy value, the server entropy value, and the non-empty packet value to a machine learning (ML) model 108. The operation may further include generating an alert based on an output of the ML model 108.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of reactants and/or functions, it should be appreciated that different combinations of reactants and/or functions may be provided by alternative embodiments without departing from the scope of the appended claims. In this regard, for example, different combinations of reactants and/or functions than those explicitly described above are also contemplated as may be set forth in some of the appended claims. Although specific terms are employed herein, they are used in a generic and descriptive sense only and not for purposes of limitation.

What is claimed:

1. A system, comprising:

processor configured to:

retrieve traffic data associated with a network session between a client device and a server, wherein the traffic data comprises at least one of: a first set of parameters associated with the client device, and a second set of parameters associated with the server;

determine a client entropy value based on the first set of parameters associated with the client device based on the retrieved traffic data;

determine a server entropy value based on the second set of parameters associated with the server based on the retrieved traffic data;

determine a non-empty packet value based on the first set of parameters associated with the client device and the second set of parameters associated with the server;

provide the client entropy value, the server entropy value, and the non-empty packet value, as an input, to a machine learning (ML) model; and generate an alert based on an output of the ML model.

2. The system of claim 1, wherein the first set of parameters comprises at least one of: transmitted bytes data, client device payload data, client device address packet data, and client device non-empty packet count data.

3. The system of claim 2, wherein the client entropy value is determined based on the transmitted bytes data, and wherein the client entropy value corresponds to a number of bytes transmitted from the client device to the server in the network session.

4. The system of claim 1, wherein the second set of parameters comprises at least one of: received bytes data, server payload data, server address packet data, and server non-empty packet count data.

5. The system of claim 4, wherein the server entropy value is further determined based on the received bytes data, and wherein the server entropy value corresponds to a number of bytes received by the server from the client device in the network session.

6. The system of claim 1, wherein the non-empty packet value is further determined based on client device non-empty packet count data and server non-empty packet count data.

7. The system of claim 1, wherein the processor is further configured to:

determine, at a first timestamp, an occurrence of a malicious activity in a first network session;

detect, at the first timestamp, a trigger based on the determination of the occurrence of the malicious activity; and provide the client entropy value, the server entropy value, and the non-empty packet value, as the input, to the ML model based on the detection of the trigger.

8. The system of claim 7, wherein the processor is further configured to determine the occurrence of the malicious activity in the first network session using a set of malicious activity detection rules.

9. The system of claim 1, wherein the processor is further configured to:

classify the network session as one of: a normal network session or a malicious network session based on the output of the ML model;

generate the alert based on the classification of the network session; and render the generated alert.

10. The system of claim 1, wherein the ML model is pre-trained to classify the network session as one of: a normal network session and a malicious network session based on the retrieved traffic data.

11. The system of claim 1, wherein the processor is further configured to train the ML model based on the retrieved traffic data, and the generated alert.

12. A method, comprising:

retrieving traffic data associated with a network session between a client device and a server, wherein the traffic data comprises at least one of: a first set of parameters associated with the client device, and a second set of parameters associated with the server;

determining a client entropy value based on the first set of parameters associated with the client device based on the retrieved traffic data;

determining a server entropy value based on the second set of parameters associated with the server based on the retrieved traffic data;

determining a non-empty packet value based on the first set of parameters associated with the client device and the second set of parameters associated with the server;

providing the client entropy value, the server entropy value, and the non-empty packet value, as an input, to a machine learning (ML) model; and generating an alert based on an output of the ML model.

13. The method of claim 12, wherein the first set of parameters comprises at least one of: transmitted bytes data, client device payload data, client device address packet data, and client device non-empty packet count data.

14. The method of claim 12, wherein the non-empty packet value is further determined based on client device non-empty packet count data and server non-empty packet count data.

15. The method of claim 12, further comprising:

determining, at a first timestamp, an occurrence of a malicious activity in a first network session;

detecting, at the first timestamp, a trigger based on the determination of the occurrence of the malicious activity; and providing the client entropy value, the server entropy value, and the non-empty packet value, as the input, to the ML model based on the detection of the trigger.

16. The method of claim 15, further comprising determining the occurrence of the malicious activity in the first network session using a set of malicious activity detection rules.

17. The method of claim 12, further comprising:

classifying the network session as one of: a normal network session or a malicious network session based on the output of the ML model;

generating the alert based on the classification of the network session; and rendering the generated alert.

18. The method of claim 12, wherein the ML model is pre-trained to classify the network session as one of: a normal network session and a malicious network session based on the retrieved traffic data.

19. The method of claim 12, further comprising training the ML model based on the retrieved traffic data, and the generated alert.

20. A non-transitory computer-readable medium having stored thereon, computer-executable instructions that when executed by a processor of a system, causes the processor to execute operations, the operations comprising:

retrieving traffic data associated with a network session between a client device and a server, wherein the traffic data comprises at least one of: a first set of parameters associated with the client device, and a second set of parameters associated with the server;

determining a client entropy value based on the first set of parameters associated with the client device based on the retrieved traffic data;

determining a server entropy value based on the second set of parameters associated with the server based on the retrieved traffic data;

determining a non-empty packet value based on the first set of parameters associated with the client device and the second set of parameters associated with the server, providing the client entropy value, the server entropy value, and the non-empty packet value, as an input, to a machine learning (ML) model; and generating an alert based on an output of the ML model.

\* \* \* \* \*